(12) United States Patent
Prust et al.

(10) Patent No.: US 7,507,193 B2
(45) Date of Patent: Mar. 24, 2009

(54) MACHINE TOOL COMPRISING AT LEAST ONE MACHINING UNIT AND METHOD OF MACHINING WORKPIECES USING SUCH A MACHINE TOOL

(75) Inventors: Dirk Prust, Tuttlingen (DE); Hans-Henning Winkler, Tuttlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 108 days.

(21) Appl. No.: 11/480,218

(22) Filed: Jun. 30, 2006

(65) Prior Publication Data

US 2007/0015646 A1 Jan. 18, 2007

(30) Foreign Application Priority Data

Jul. 14, 2005 (DE) .................. 10 2005 034 431

(51) Int. Cl.
*B23Q 3/157* (2006.01)
(52) U.S. Cl. .................. 483/1; 483/15; 29/563
(58) Field of Classification Search .................. 29/563, 29/564, 38 A, 38 B, 33 P; 483/14, 15, 30, 483/31, 36; 409/163, 164, 167
See application file for complete search history.

(56) References Cited

U.S. PATENT DOCUMENTS

| 4,984,351 | A | | 1/1991 | Matsuyama et al. |
| 5,781,983 | A | * | 7/1998 | Gruner .................. 29/563 |
| 6,203,478 | B1 | * | 3/2001 | Gorrochategui .............. 483/31 |
| 6,513,231 | B1 | | 2/2003 | Hafenrichter et al. |
| 6,557,235 | B1 | * | 5/2003 | Katz et al. .................. 29/563 |
| 6,745,454 | B1 | * | 6/2004 | Grimshaw et al. ............. 29/563 |
| 6,865,788 | B2 | * | 3/2005 | Pasquetto .................. 29/38 B |
| 2002/0006764 | A1 | | 1/2002 | Hanisch et al. |
| 2003/0145449 | A1 | | 8/2003 | Lutz |

FOREIGN PATENT DOCUMENTS

| DE | 39 21 042 A1 | 12/1989 |
| DE | 101 63 445 A1 | 7/2003 |
| DE | 103 34 285 A1 | 2/2005 |
| DE | 10 2004 006 351 A1 | 8/2005 |
| EP | 1 216 789 A2 | 6/2002 |
| EP | 1 342 535 A1 | 9/2003 |
| EP | 1 466 697 A2 | 10/2004 |
| GB | 2 095 138 A | 9/1982 |
| WO | 2005/005098 A1 | 1/2005 |

* cited by examiner

*Primary Examiner*—Dana Ross
(74) *Attorney, Agent, or Firm*—Harness, Dickey & Pierce, P.L.C.

(57) ABSTRACT

A machine tool comprising at least one machining unit having at least one work spindle for accommodating tools in order to machine workpieces in a working area is provided with a first and a second transport device, by which workpieces are transported between the working area and a loading/unloading station. A second machining unit is arranged laterally next to the first machining unit in such a way that, alternating with the first machining unit, it can reach the workpieces in the working area from the same direction.

17 Claims, 6 Drawing Sheets

MACHINE TOOL COMPRISING AT LEAST ONE MACHINING UNIT AND METHOD OF MACHINING WORKPIECES USING SUCH A MACHINE TOOL

FIELD OF THE INVENTION

The present invention relates to a machine tool comprising at least one machining unit having at least one work spindle for accommodating tools in order to machine workpieces in a working area, and comprising a first transport device for transporting workpieces between the working area and a loading/unloading station.

The invention also relates to a method of machining workpieces using such a machine tool.

BACKGROUND OF THE INVENTION

Numerous machine tools and methods for machining workpieces in a working area are known from the prior art.

In addition to ever increasing accuracy requirements imposed on the machining result, such machine tools and methods are subject to the further requirement that the throughput of workpieces is to be continually increased by such machine tools with little outlay in terms of design and with a high machining accuracy.

A machine tool of the type mentioned at the outset has been disclosed, for example, in DE 101 63 445 A1, which describes a transfer line having a plurality of machining stations and a first transport device by which the workpieces are transported between the machining stations. Second transport devices are provided in the machining stations, the workpiece being transferred from the first to the second transport device by means of a gripper arranged on the first transport device.

The workpiece mounted on the second transport device is then machined in the respective machining station, the workpiece being moved by the second transport device during the machining in order to position it for different machining operations. In each machining station, the workpiece can be machined on opposite sides in each case by a plurality of work spindles.

Furthermore, a robot is provided which loads workpieces to be machined onto the first transport unit and removes machined workpieces from the first transport unit.

In this transfer line, the throughput of workpieces is not sufficiently high, since the workpiece change itself is effected relatively slowly, for the first transport device serves the individual machining stations in succession.

In a machine tool known from DE 103 34 285 A1, two machining units are each provided with a plurality of work spindles, the machining units accessing the workpiece from opposite sides. The work spindles in such a machining unit are spaced apart from each other at a distance which corresponds to the distance between workpieces which are held in one or more clamping devices. The clamping devices are designed to be traversable and pivotable.

In this way, identical machining operations can be carried out simultaneously on all the workpieces in one machining step, it also being possible for the two machining units, by means of their respective work spindles, to machine the workpieces at the same time on opposite sides.

Tool magazines can be provided for both machining units in order to be able to carry out different machining operations one after the other on the same side of a workpiece using one and the same machining unit.

In this machine tool, too, the throughput of workpieces is not sufficiently high, since the tool change requires correspondingly long non-productive time between the individual machining steps.

SUMMARY OF THE INVENTION

In view of the above, one object of the present invention is to provide a machine tool of the type mentioned at the outset in which the throughput of workpieces can be increased in a simple manner in terms of design.

In the machine tool mentioned at the outset, this and other objects are achieved in that a second transport device is provided for transporting workpieces between the working area and the loading/unloading station.

In this way, this and other objects underlying the invention are completely achieved.

This is because the inventor of the present application has recognized that a limiting factor in the throughput of workpieces is the fact that finish-machined workpieces must first always be removed from the working area before workpieces to be machined are transported into the working area.

In particular if the machine tools are to be combined into machining centers or transfer lines, provision is always made in the prior art—as in the machine tool of the generic type—for a transport device which transports the workpieces to the respective working area, where they are then transferred, for example, to a fixture and are clamped in place there before they can be machined.

Now because two transport devices are provided according to the invention, the first transport device can be standing by after completion of the machining of the workpiece in order to receive the finished workpiece, while the second transport device with workpieces still to be machined is also already standing by in the working area in order to keep available the next workpiece to be machined, which is then machined either directly on the transport device or else after transfer to a fixture.

In this way, finished parts can be rapidly removed and blank parts can be rapidly fed in at the same time; the transport of workpieces in the machine tool thus takes place separately from the external loading/unloading. Furthermore, the transport devices can act like a buffer or an internal intermediate store, so that the tool change is no longer a limiting factor for the throughput of the novel machine tool.

In view of the above, the present invention also relates to a method of machining workpieces using the novel machine tool, in which workpieces to be machined are loaded onto one of the transport devices and are transported by said transport device into the working area in order to machine them, and in which already finish-machined workpieces are transported out of the working area by the other transport device.

Both transport devices therefore serve the same purpose; they alternately transport workpieces to be machined into the working area and remove finish-machined workpieces from the working area.

The design of such a second transport device involves little outlay, for in the simplest case only a carriage arranged on a guide is to be provided, this carriage moving back and forth between the loading/unloading station and the working area. The requirements for the positioning accuracy of this carriage need not be high, for the workpieces can be seized and transported by grippers for example; it is merely necessary for the workpieces to be firmly and accurately clamped in place where they are also machined, that is to say, as a rule, on the clamping fixture, generally called fixture, which is often designed as a cradle fixture in order to be able to pivot the workpieces.

According to a further object, a second machining unit is arranged laterally next to the first machining unit in such a way that, alternating with the first machining unit, it has access to the workpieces in the working area from the same direction.

The throughput of workpieces is also markedly increased by this measure, because, while the first machining unit now machines the workpiece on a first side for example, the tools can be exchanged on the second machining unit, so that the tool change now does not reduce the throughput of workpieces as non-productive time but rather is effected during primary processing time.

Although at first glance it may appear to be unfavourable to provide two machining units laterally next to one another in a machine tool, which thus have access to the workpiece to be machined from the same direction, a decisive advantage is nonetheless obtained over known machine tools in which the machining units are arranged on opposite sides.

This is because, if the machining units are arranged on opposite sides of a workpiece, the workpiece must always be swivelled, for example, if it is to be machined on its first side first by the first machining unit and then by the second machining unit. However, this swivelling impairs the machining accuracy in a manner known per se, the swivelling and re-positioning of the workpiece or workpieces also being non-productive time, which reduces the throughput.

With two machining units arranged laterally next to one another, the workpiece can now remain in its set-up; as soon as the first machining unit has completed its machining operation, it is moved away from the workpiece and at the same time the second machining unit with new tools already clamped in is fed in, so that a very short chip-to-chip time can be realized.

A further advantage with this arrangement consists in the fact that the tool exchange is no longer a time-limiting factor, so that tool magazines of simpler design may be provided. Furthermore, it is now possible to use stationary tool magazines which the machining units can approach in each case for the tool change during primary processing time, that is to say as the respective other machining unit is machining the workpiece.

In known machine tools which have only one machining unit, such stationary tool magazines are undesirable, since they lead to long non-productive time on account of the approach to the tool magazine and of the return to the workpiece; the tool change thus proves to be an adverse time-limiting factor. In the known machine tools, the tool magazines are therefore coupled to the machining units, which, however, means that the moving masses are markedly increased, so that the accelerations achievable for the infeed and the withdrawal of the machining units are limited.

Since, according to the invention, the tool magazine now no longer needs to travel along with the machining units, the mass of the machining units is lower than in the prior art, so that high accelerations and thus quicker traverse speeds are achieved.

In addition, stationary tool magazines impose significantly lower requirements in terms of design, so that the novel machine tool is of simple design despite the two machining units and the two tool magazines.

Since the use of two machining units arranged laterally next to one another on their own, that is to say without the two transport devices, is also novel and inventive, a further object of the present invention relates to a machine tool comprising at least two machining units having in each case at least two work spindles for clamping tools in order to machine workpieces in a working area, the machining units being arranged next to one another in such a way that they can alternately access the workpieces in the working area from the same direction.

In such machine tools, it is preferred that each transport device has a carriage which is traversable along a guide and is intended for accommodating at least two workpieces, the guide of the second transport device preferably being arranged parallel to the guide of the first transport device.

With this measure, it is advantageous that transport devices of simple design are used, which in addition run next to one another, so that the handling devices can access both the one and the other transport device without a large design outlay.

According to still another object, a loading device is provided at the loading/unloading station in order to load one of the transport devices with workpieces to be machined and unload machined workpieces from the respective other transport device.

Here, it is advantageous that only one loading device has to be used in order to serve both transport devices, the workpieces to be machined being fed, for example, via a first conveyor belt and the machined workpieces being put onto a second conveyor belt which removes them.

According to an even further object, at least one fixture for clamping in place workpieces to be machined is provided in the working area, and if a transfer device is provided in order to transfer workpieces between the at least one fixture and the transport device or devices, the transfer device preferably comprising a gripping device on the machining unit.

This measure, too, is advantageous from the design point of view, for the transport devices serve merely to feed and remove the workpieces; the actual machining takes place on workpieces mounted on the fixture. As already mentioned, the positioning accuracy and the construction of the transport devices do not have to meet stringent requirements, so that they can be of inexpensive design.

According to another object, if the transfer device comprises a gripping device at one of the machining units, for the displacement options of the machining unit can then be used in order to feed the gripper in towards the workpieces, whether on the fixture or on a carriage of the transport device.

Although it would be possible to use "tool grippers" which are clamped in place in work spindles, a magazine space in the tool magazines would be occupied as a result, for which reason, according to the invention, the gripping device is provided in addition to the work spindles on the machining unit. The gripping device may in this case be arranged in a stationary manner on the, or on each, machining unit, it also being possible to design the gripping device in such a way that it is vertically adjustable for example, so that it can be moved upwards during the machining of workpieces, so that it cannot collide with the workpieces, whereas it can be moved downwards for the transfer of workpieces.

It is generally preferred if each machining unit has at least two work spindles, and the at least one fixture is designed for accommodating at least the same number of workpieces as the number of work spindles provided in a machining unit.

With this measure, it is advantageous that, for example, two workpieces can be machined at the same time, in which case, although two work spindles are necessary, only one displacement device is necessary in order to move the two work spindles relative to the workpieces clamped in place in the fixture.

In this way, it is possible to produce two or more identical parts at the same time. Such production of workpieces in sets brings about advantages in documentation and quality management, and "right-hand and left-hand" parts can also be produced in an accurately fitting manner.

If the advantage of the tool change during primary processing time can be dispensed with, as many workpieces as there are work spindles provided together in both machining units can also be mounted on the fixture. If, for example, two machining units with in each case two work spindles are provided, four workpieces can therefore be mounted on the fixture, the one machining unit then producing a set of two right-hand parts and the other machining unit producing a set of two left-hand parts.

Alternatively, it is also possible to provide two fixtures in the working area, and these fixtures can each accommodate the same number of workpieces as the number of work spindles present in a machining unit. This especially has advantages when "left-hand parts" are to be machined by the one machining unit and, "right-hand parts" are to be machined by the other machining unit.

In all cases, the advantage of the tool change during primary processing time is certainly dispensed with, but the abovementioned advantage of the quicker throughput of workpieces through the novel machine tool is nonetheless obtained due to the two transport devices.

It may also be mentioned that, during the production of parts in sets in, as it were, one set-up and with one and the same machining throughput, there are not only advantages with regard to documentation and quality management; the "accuracy of fit" of the parts thus produced relative to one another is markedly greater, since they are produced, as it were, at the same time and they are therefore affected by the identical thermal deflections of the machine tool.

For example, if right-hand and left-hand parts were produced on two different machine tools, the accuracy of fit of the right-hand and left-hand parts relative to one another could not be ensured to the same extent as on the novel machine tool.

It is generally also preferred if at least one tool magazine is provided for tools introduced into the work spindles as replacements, preferably one tool magazine for each machining unit.

Although it is possible to provide a common tool magazine for both machining units, the use of two machine tools offers further advantages. Firstly, the number of storage spaces for tools is increased; secondly, the machine tool can be arranged in such a way that the two machining units cannot get in each other's way during the tool change.

In view of the above, the present invention also relates to a method of machining workpieces using the novel machine tool, in which at least two workpieces are machined at the same time by a machining unit having a corresponding number of work spindles, while tools are changed at the work spindles of the other machining unit.

The advantages associated with this tool change during primary processing time have already been discussed above in detail.

Finally, the present invention also relates to a machining centre having two novel machine tools which are arranged on opposite sides of a common loading/unloading station.

This measure is also advantageous from the design point of view, for the loading/unloading station only needs to be provided once, although it "serves" two machine tools.

BRIEF DESCRIPTION OF THE DRAWINGS

Further advantages follow from the description and the attached drawings.

It goes without saying that the abovementioned features and the features still to be explained below can be used not only in the respectively specified combination but also in other combinations or on their own without departing from the scope of the present invention.

Figure 1:
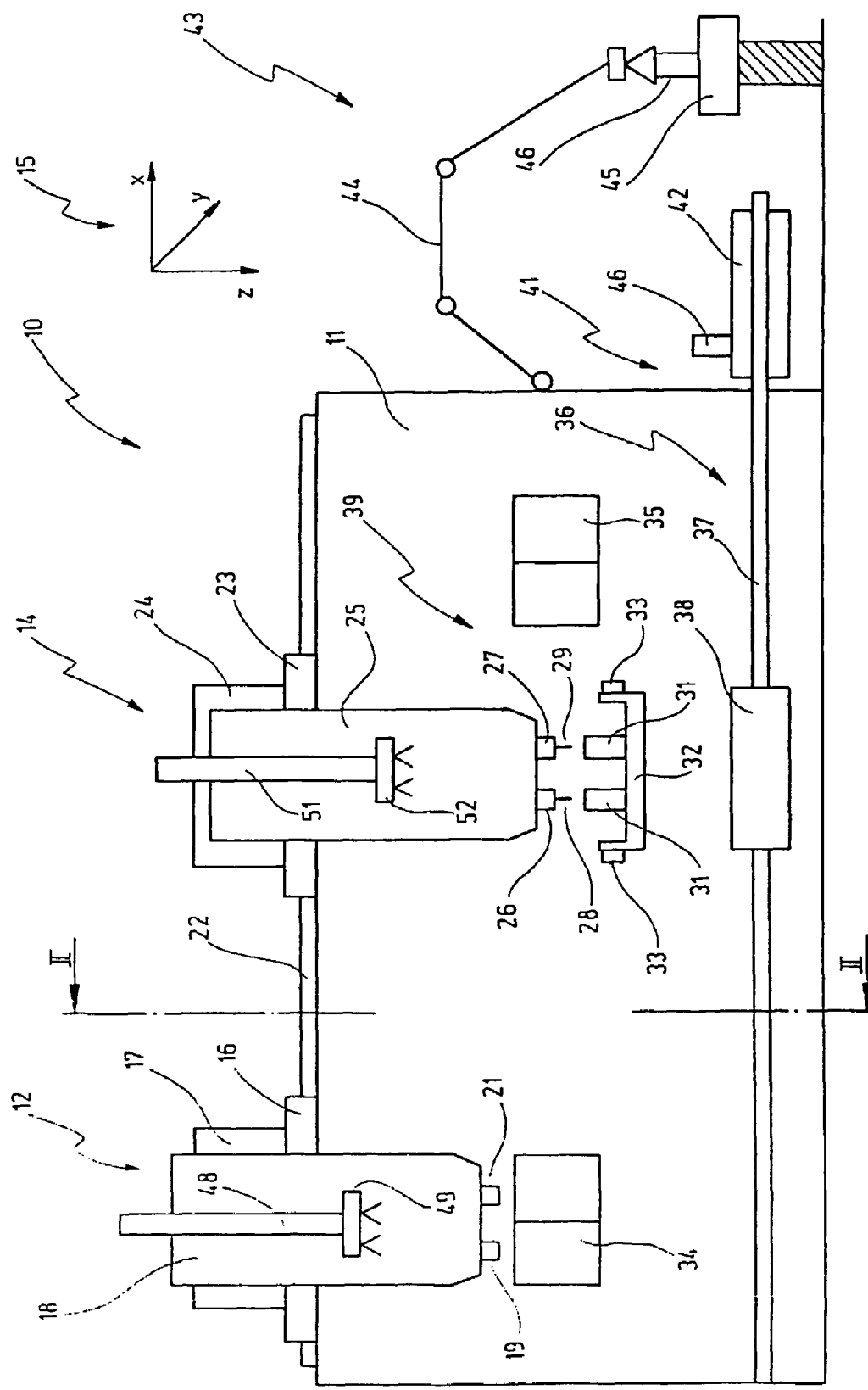
Figure 2:
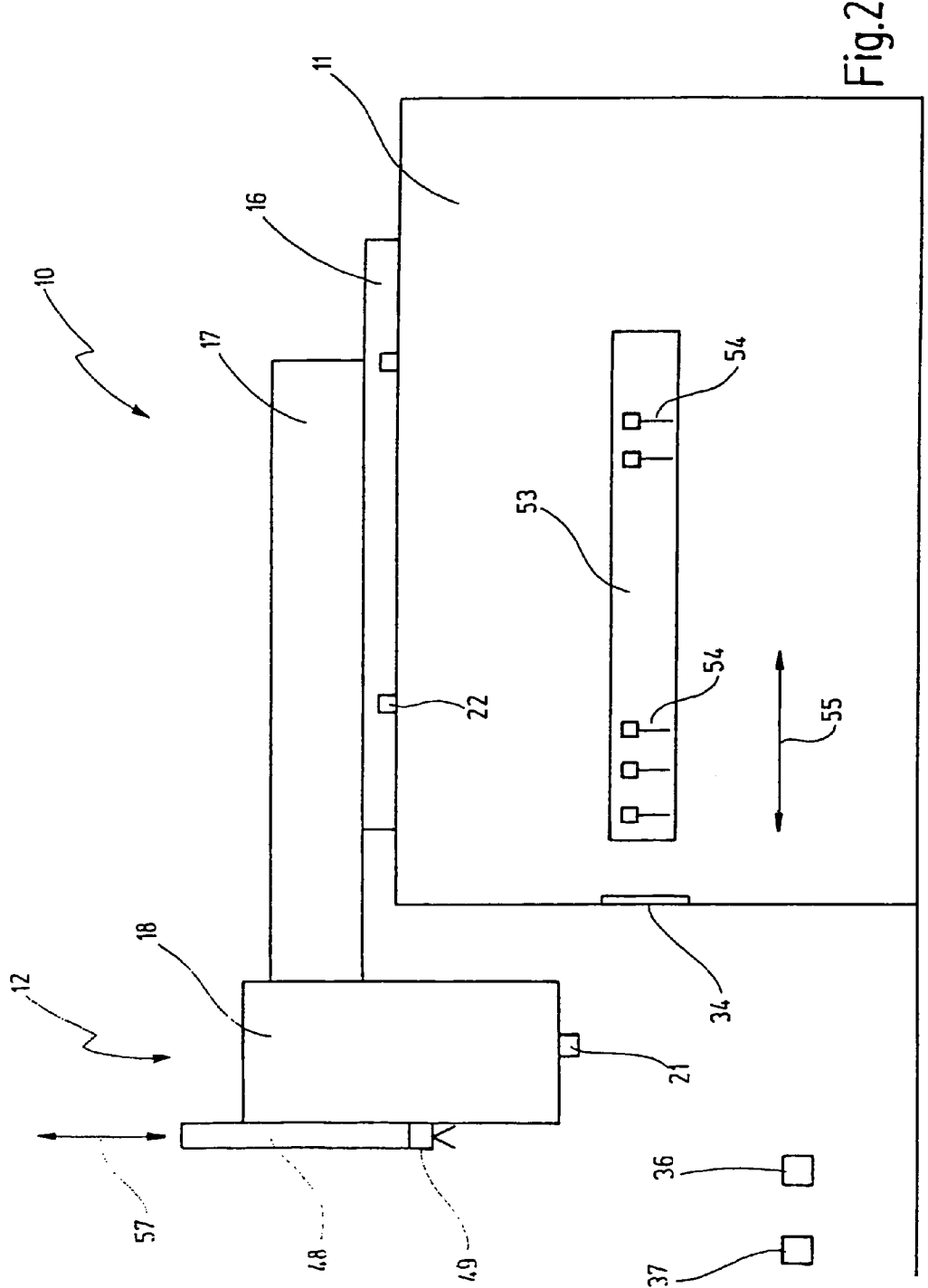
Figure 3:
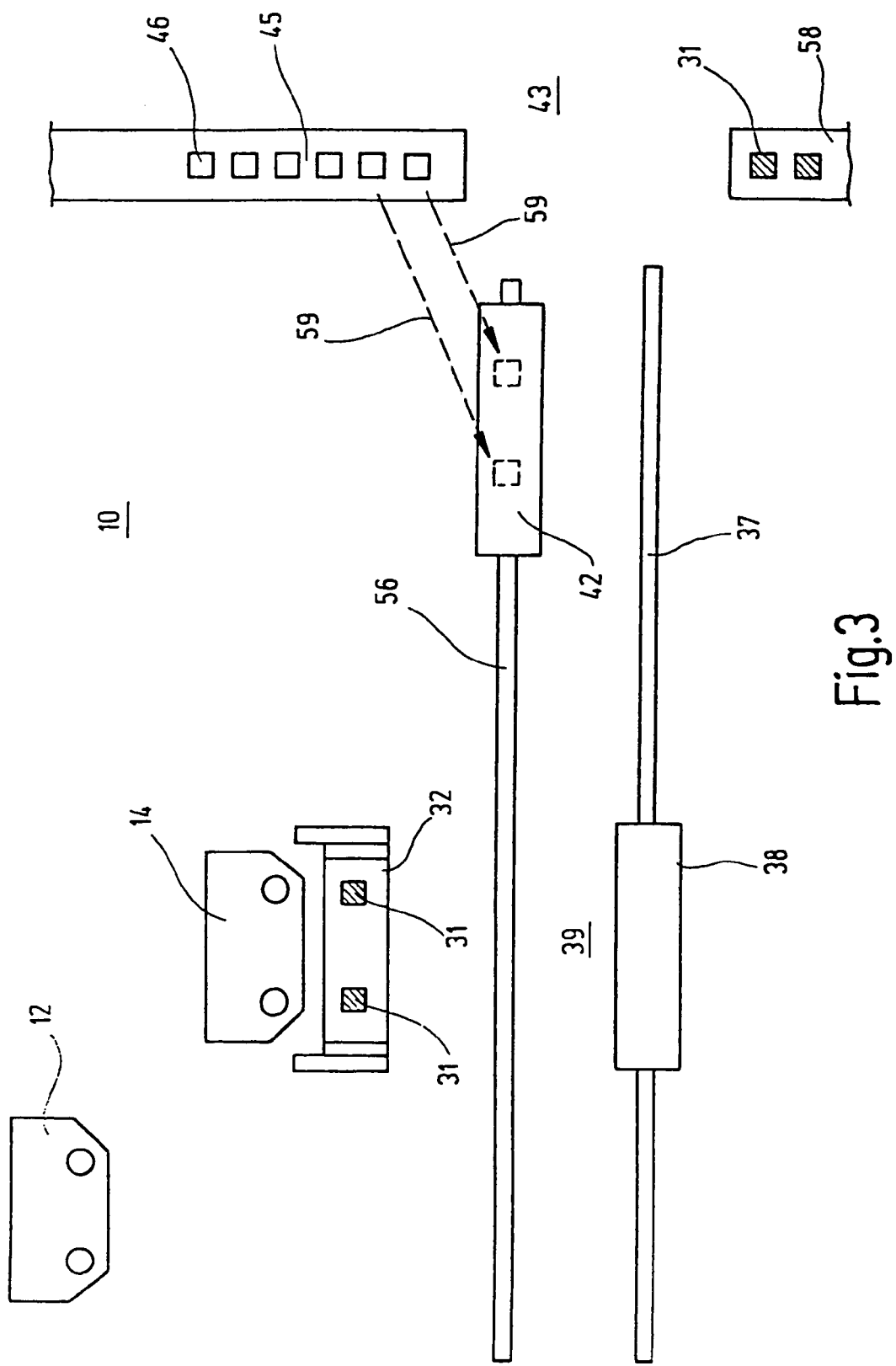
Figure 4:
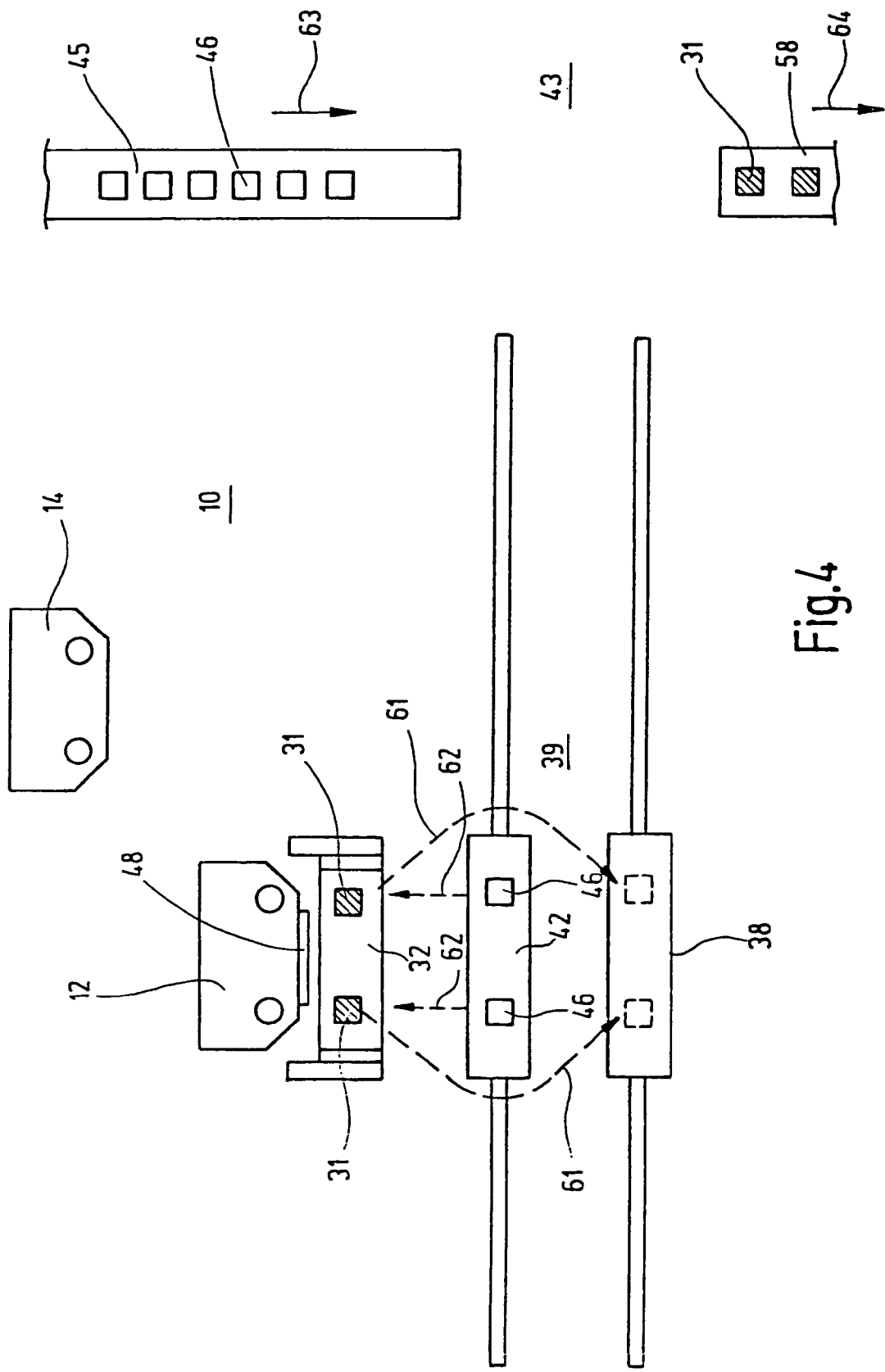
Figure 5:
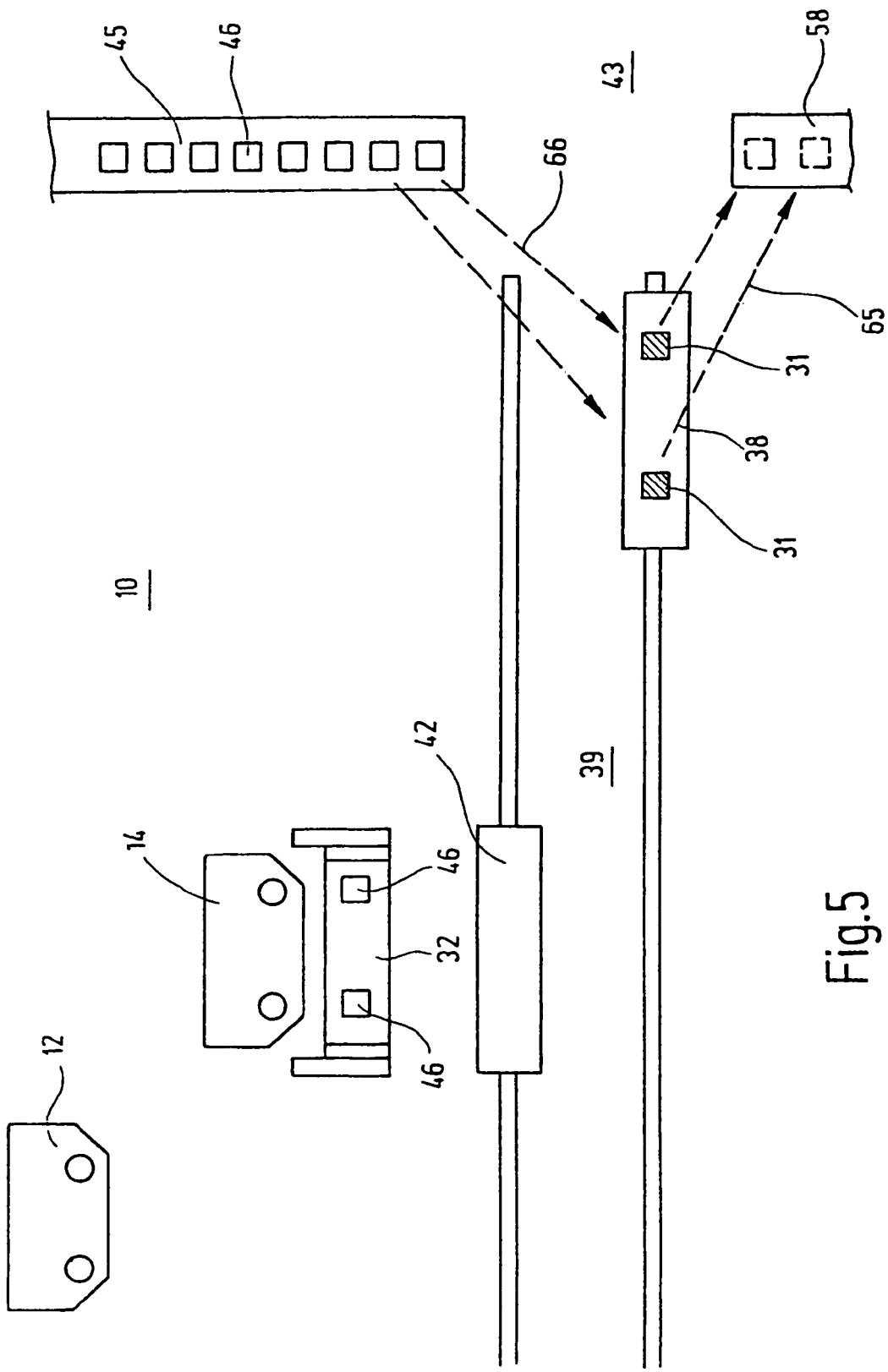
Figure 6:
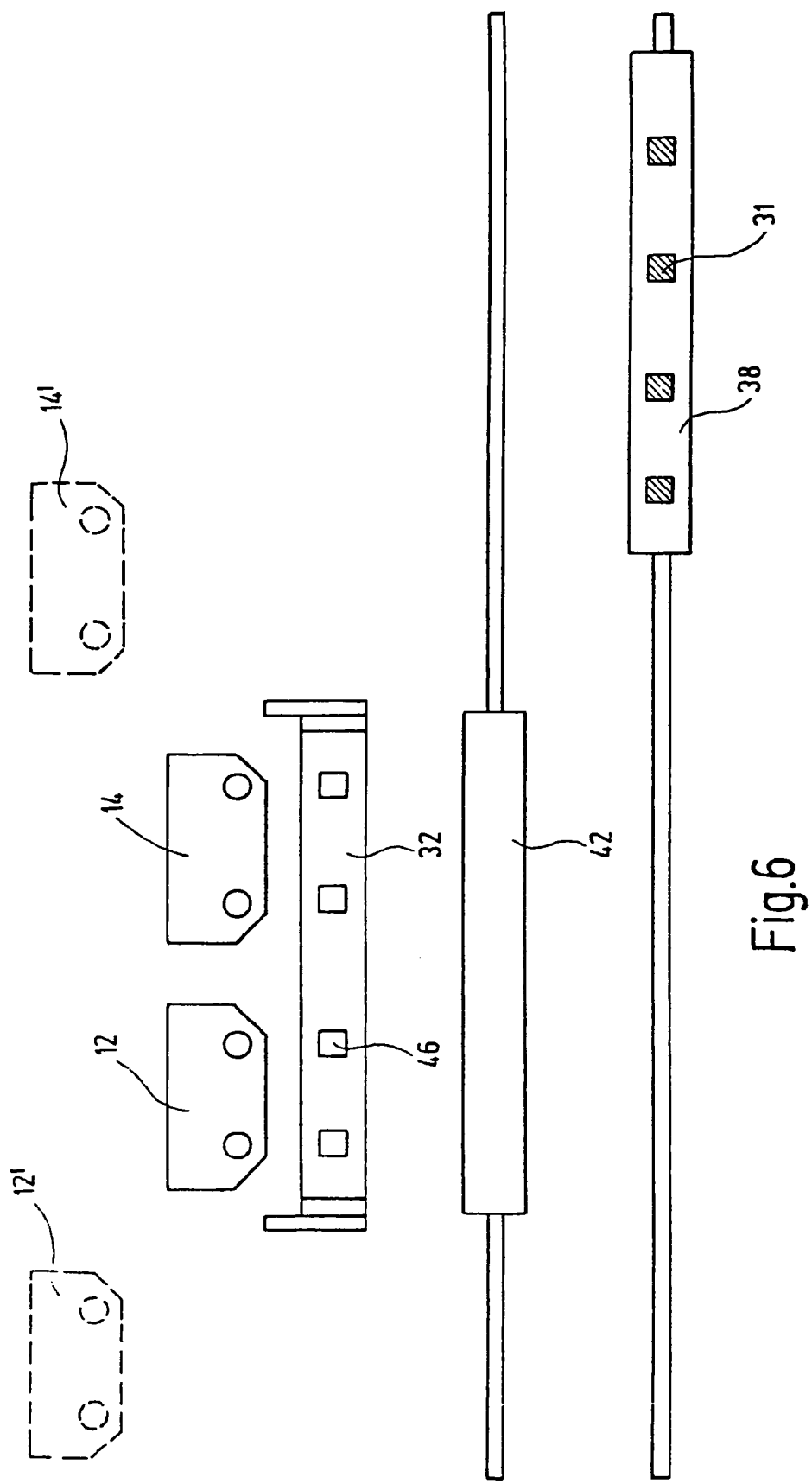

The invention is shown in the drawings and is described in more detail below. In the drawings:

FIG. 1 shows the novel machine tool in a schematic front view;

FIG. 2 shows a section through the novel machine tool along line II-II,

FIG. 3 shows a detailed and schematic plan view of the machine tool according to FIG. 1;

FIG. 4 shows an illustration as in FIG. 3, but at another instant of the machining of workpieces;

FIG. 5 shows an illustration as in FIG. 3 and FIG. 4, but at still another instant of the workpiece machining; and FIG. 6 shows an illustration as in FIG. 3, but with a fixture for mounting four workpieces which are simultaneously machined by two machining units with two respective work spindles.

DETAILED DESCRIPTION OF PREFERRED EMBODIMENTS

Shown in FIG. 1 is a schematic front view of a machine tool 10 which has a machine frame 11. A first machining unit 12 and a second machining unit 14 are arranged on the machine frame 11 in such a way as to be displaceable in the coordinate directions x, y, z, as indicated by the system of coordinates 15.

The two machining units 12, 14 are arranged laterally next to one another in the x direction.

The first machining unit 12 has an x slide 16 which is traversable in the x direction and on which a y slide 17 traversable in the y direction is arranged. The y slide 17 carries a spindle head 18, which is traversable in the z direction in a known manner.

A first vertically oriented work spindle 19 and a second vertically oriented work spindle 21 are mounted in the spindle head 18.

Shown at the top of the machine frame 11 is a guide rail 22 on which the x slide 16 is traversable in the x direction.

In the same way, the second machining unit 14 has an x slide 23, a y slide 24 and a spindle head 25, which carries a first vertical work spindle 26 and a second vertical work spindle 27.

Clamped in place in the work spindles 26, 27 are tools 28, 29, by means of which two workpieces 31 are machined which are mounted on a fixture 32 designed as a cradle. The fixture 32 is pivotably mounted on the machine frame 11 via two bearing blocks 33.

Also shown in the machine frame are two flap pairs 34, 35, behind which a respective tool magazine for the first machining unit 12 and the second machining unit 14 is arranged. For the tool change, the flaps 34 and 35, respectively, are opened and the tool magazine travels out of the machine frame in the y direction. The machining units 12 and 14, respectively, then approach the tool magazine in order to change the tools by the pick-up method.

Such a tool magazine and a tool change with two work spindles 19, 21 and 26, 27, respectively, arranged parallel to one another have been disclosed by DE 103 44 642 A1 of this applicant, so that, as far as further details are concerned, reference is made to this laid-open specification, the content of which, by reference, is made the subject matter of the present application.

Furthermore, the machine tool 10 also has a first transport device 36, the guide 37 of which extends in the x direction. A carriage 38 is mounted on the guide 37 in such a way as to be traversable in the x direction. In FIG. 1, the carriage 38 is located in a working area 39 of the machine tool 10, that is to say directly next to the fixture 32.

The machine tool 10 also has a second transport device 41, the guide of which is not shown in FIG. 1, since it lies in the y direction behind the guide rail 37 of the first transport device. This means that the two guides of the two transport devices 36 and 41 run parallel to one another in the x direction.

The second transport device 41 likewise has a carriage 42, which in FIG. 1 is located at a loading/unloading station 43. The loading/unloading station has a schematically indicated loading device 44, by which workpieces 46 to be machined are loaded onto the carriage 42 from a conveyor belt 45.

In the same way, the loading device 44 is designed for removing workpieces from the carriage 38 and transferring them onto a conveyor belt (not shown in FIG. 1) which removes the finish-machined workpieces.

For this purpose, the workpieces 31, after their completion, are transferred from the fixture 32 onto the carriage 38 by means of transfer devices 48, 51 which are arranged on the spindle heads 18 and 24, respectively, in such a way as to be displaceable in the z direction.

Each transfer device 48, 51 has a gripping device 49 and 52, respectively, which can seize two workpieces 31 and 46, respectively, and transfer them between the device 32 and one of the carriages 38 and 42.

As will be described in more detail below, the carriage 42 transports the workpieces 46 to be machined into the working area 39 and waits there until the workpieces 31 have been finish-machined. The workpieces 31 are then transferred by the gripping device 49 or 52 from the fixture 32 onto the carriage 38, which then travels into the loading/unloading station 43, where the finished workpieces 31 are transferred onto a conveyor belt.

As soon as the workpieces 31 have been transferred onto the carriage 38, the workpieces 46 are taken from the carriage 42 and inserted into the fixture 32, where they are machined, while the carriage 38 is unloaded and thereafter loaded with new workpieces.

In this way, the handling in the loading/unloading station 43 does not limit the time for the workpiece change, for there is always a carriage 38 or 42, respectively, with workpieces to be machined and also a free carriage 42 or 38, respectively, for receiving workpieces to be machined in the working area 39 when a workpiece change is due.

The workpieces 31 and 46, respectively, are now machined in the device 32 alternately by the machining units 12 and 14. While in FIG. 1 the machining unit 14 machines the workpieces 31, a tool change takes place at the machining unit 12 during the primary processing time. As soon as the machining of the workpieces 31 by the tools 28, 29 has been completed, the machining unit 14 approaches the tool magazine behind the flaps 35, while the machining unit 12 approaches the fixture 32 and can immediately continue with the further machining of the workpieces 31 without having to spend non-productive time waiting for the workpiece change.

In combination, the two machining units 12 and 14, accessing the workpieces 31 from the same direction, together with the transport devices 36 and 41 ensure that the non-productive time during the machining of workpieces 31, 46 with the novel machine tool 10 is markedly reduced, so that the throughput of machined workpieces in the novel machine tool 10 is markedly increased, which will be explained in more detail in connection with FIGS. 3 to 6.

First of all, however, the machine tool 10 from FIG. 1 is shown sectioned in FIG. 2 in the direction of arrows II-II in FIG. 1, so that the arrangement of the first machining unit 12 on the machine frame 11 can be seen. Furthermore, the flaps 34, behind which a tool magazine 53 is located, in which tools 54 are stored, can be seen on the machine frame 11. The tool magazine 53 can be moved out of the flaps 34 in the direction of an arrow 55 to the left in FIG. 2, so that the tools 54 come to lie under the spindle head 18, where a tool change can be effected by the pick-up method, as described in detail in the abovementioned DE 103 44 642 A1 for machining units with a double spindle.

After the tool change, the tool magazine 53 is withdrawn into the machine frame 11 again and the flaps 34 are closed, so that no chips and no coolant pass onto the stored tools 54 during the machining of workpieces.

FIG. 2 also shows the guide 37 of the first transport device 36 and a guide 56 of the second transport device 41; the carriages 38 and 42 cannot be seen in the sectional illustration selected.

The arrangement is made at the machine tool 10 in such a way that the gripping device 49 can be moved downwards in the direction of an arrow 57 in order to then approach, by further movement of the spindle head 18, both the carriage 38 located on the guide 37 and the carriage 42 located on the guide 56, to unload or pick up workpieces there and to then deposit the latter on the fixture 32, which likewise cannot be seen in FIG. 2.

FIG. 3 is a plan view of the machining situation as shown in FIG. 1, although only the machining units 12, 14, the fixture 32 and the carriages 38 and 42 and finally also the conveyor belt 45, on which the workpieces 46 to be machined are fed, can be seen.

Furthermore, a conveyor belt 58 on which the finish-machined workpieces 31 are deposited can also be seen in FIG. 3.

In the phase of the machining shown in FIG. 3, the workpieces 31 are being machined at that moment on the fixture 32 by the machining unit 14, while the machining unit 12 is moved into its tool-change position in order to introduce new tools as replacements.

The carriage 38 waits in the working area 39 in order to receive finish-machined workpieces 31, while the carriage 42, at the loading/unloading station 43, at that moment receives workpieces 46 to be machined, which is indicated by dashed arrows 59.

Next, the carriage 42 is now likewise moved into the working area 39. Once the machining of the workpieces 31 has been completed, the machining unit 12, according to FIG. 4, approaches the fixture 32, in the course of which its transfer device 48 indicated only schematically travels downwards, so that the workpieces 31 can be transferred onto the carriage 38, which is indicated by dashes 61. After that, it takes over the workpieces 46 from the carriage 42 and transfers them onto the fixture 32, which is indicated by dashed arrows 62.

The carriage 38 with the finish-machined workpieces 31 now travels to the right in FIG. 4 into the loading/unloading station 43. The conveyor belt 45 moves workpieces 46 to be machined in the direction of an arrow 63, and the conveyor belt 58 moves finish-machined workpieces 31 in the direction of an arrow 64.

The machining unit 14, which is located in its tool-change position, in the meantime introduces the next tools as replacements in order to now be able to machine the workpieces 46 on the fixture 32. This situation is shown in FIG. 5.

The finish-machined workpieces 31 on the carriage 38 are now loaded onto the conveyor belt 58, which is indicated by arrows 65. After that, workpieces 46 to be machined are loaded onto the carriage 38, which is indicated by arrows 66.

The carriage 42 remains in the working area 39 in order to receive the workpieces 46 when they have been finish-machined. Once the machining of the workpieces 46 by the machining unit 14 has been completed, the latter travels into its tool-change position, while the machining unit 12 is moved up to the fixture 32 in order to machine the workpieces 46 from the same side as machined by the machining unit 14 beforehand.

The machining sequence shown in FIGS. 3 to 5 is repeated cyclically, a carriage 38, 42 always receiving workpieces 46 to be machined, which are transported into the working area 39, where they are transferred onto the fixture 32 and are finish-machined. After that, the finish-machined workpieces 31 are put back onto the corresponding carriage 38 or 42, respectively, again and are moved back into the loading/unloading station 43. The respective other carriage 42, 38 has at the same time been loaded with workpieces 46 to be machined and has likewise been moved into the working area 39.

It is of course possible to provide a further machine tool 10 on the right next to the loading/unloading station 43, so that the loading/unloading station 43 serves, as it were, two machine tools 10, which are each constructed like the machine tool 10 according to FIGS. 1 to 5.

If the time advantage due to the tool change at the machining units 12 and 14 during primary processing time is not required, the fixture 32 may also be designed in such a way that it carries four workpieces 46 to be machined, which are then machined at the same time and in parallel by the machining units 12 and 14, as shown in FIG. 6.

As an alternative to the fixture 32 for four workpieces, two fixtures 32 for two respective workpieces may also be arranged next to one another in the x direction.

Whereas in the embodiments according to FIGS. 1 to 5 the fixture 32 and the carriages 38 and 42 are designed to accommodate as many workpieces 31, 46 as corresponds to the number of work spindles 19, 21; 26, 27 in the machining units 12 and 14, they are designed according to FIG. 6 for accommodating as many workpieces as work spindles 19, 21; 26, 27 are together present in the machining units 12 and 14. Instead of two work spindles 19, 21; 26, 27, it is of course also possible to keep three or more of such work spindles available in each machining unit 12 and 14.

It may also be mentioned that FIG. 6 shows a machining state as in FIG. 5, but now with four and not with two workpieces per carriage 42, 38.

The tool change at the machining units 12, 14 is now no longer effected during primary process time; both machining units 12, 14 are traversed into their tool-change positions 12' and 14', respectively, for the tool change, but the time advantage due to the two carriages 38 and 42 is also achieved in the embodiment according to FIG. 6.

Therefore, what is claimed is:

1. A machine tool comprising a loading/unloading station, a working area and at least one machining unit having at least one work spindle for accommodating tools in order to machine workpieces in said working area, and comprising a first transport device for transporting workpieces between said working area and said loading/unloading station, a second transport device for transporting workpieces between said working area and said loading/unloading station, at least one fixture for clamping in place workpieces to be machined in the working area, and at least one transfer device arranged on the machining unit and having a gripping device for transferring workpieces between the at least one fixture and the transport device.

2. The machine tool of claim 1, wherein a second machining unit is arranged laterally next to the first machining unit in such a way that, alternating with the first machining unit, it has access to the workpieces in the working area from the same direction.

3. The machine tool of claim 2, wherein each transport device has a carriage which is traversable along a guide and is designed for accommodating at least two workpieces.

4. The machine tool of claim 2, wherein a loading device is provided at the loading/unloading station in order to load one of the transport devices with workpieces to be machined and unload machined workpieces from the respective other transport device.

5. The machine tool of claim 2, wherein each machining unit has at least two work spindles, and at least one fixture is provided in the working area and designed for accommodating at least the same number of workpieces as the number of work spindles provided in a machining unit.

6. The machine tool of claim 1, wherein each transport device has a carriage which is traversable along a guide and is designed for accommodating at least two workpieces.

7. The machine tool of claim 6, wherein the guide of the second transport device is arranged parallel to the guide of the first transport device.

8. The machine tool of claim 6, wherein a loading device is provided at the loading/unloading station in order to load one of the transport devices with workpieces to be machined and unload machined workpieces from the respective other transport device.

9. The machine tool of claim 6, wherein each machining unit has at least two work spindles, and at least one fixture is provided in the working area and designed for accommodating at least the same number of workpieces as the number of work spindles provided in a machining unit.

10. The machine tool of claim 9, wherein a tool magazine is assigned to each machining unit. transport device is arranged parallel to the guide of the first transport device.

11. The machine tool of claim 1, wherein a loading device is provided at the loading/unloading station in order to load one of the transport devices with workpieces to be machined and unload machined workpieces from the respective other transport device.

12. The machine tool of claim 1, wherein each machining unit has at least two work spindles, and at least one fixture is provided in the working area and designed for accommodating at least the same number of workpieces as the number of work spindles provided in a machining unit.

13. The machine tool of claim 1, wherein the number of fixtures arranged in the working area is the same as the number of machining units provided.

14. The machine tool of claim 1, wherein at least one tool magazine is provided for tools introduced into the work spindles as replacements.

15. A machine tool comprising a working area and at least two machining units each having at least two work spindles for accommodating tools in order to machine workpieces in said working area, the machining units being arranged next to one another in such a way as to alternately access the workpieces in the working area from the same direction;

wherein at least two transport devices are provided for transporting workpieces between the working area and a loading/unloading station;

wherein at least one fixture for clamping in place workpieces to be machined is provided in the working area; and wherein at least one transfer device having a gripping device is arranged on each machining unit for transferring workpieces between the at least one fixture and the transport devices.

16. The machine tool of claim 15, wherein each transport device has a carriage which is traversable along a guide and is designed for accommodating at least two workpieces.

17. The machine tool of claim 16, wherein the guide of the second transport device is arranged parallel to the guide of the first transport device.

* * * * *

UNITED STATES PATENT AND TRADEMARK OFFICE
CERTIFICATE OF CORRECTION

| | |
|---|---|
| PATENT NO. | : 7,507,193 B2 |
| APPLICATION NO. | : 11/480218 |
| DATED | : March 24, 2009 |
| INVENTOR(S) | : Dirk Prust et al. |

It is certified that error appears in the above-identified patent and that said Letters Patent is hereby corrected as shown below:

Column 10,
Lines 40-41, delete "transport device is arranged parallel to the guide of the first transport device."

Signed and Sealed this

Nineteenth Day of May, 2009

JOHN DOLL
*Acting Director of the United States Patent and Trademark Office*